US 6,633,703 B2

(12) United States Patent
Katayama

(10) Patent No.: US 6,633,703 B2
(45) Date of Patent: Oct. 14, 2003

(54) OPTICAL MULTIPLEXER/DEMULTIPLEXER

(75) Inventor: Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/848,409

(22) Filed: May 4, 2001

(65) Prior Publication Data
US 2002/0057865 A1 May 16, 2002

Related U.S. Application Data
(60) Provisional application No. 60/234,188, filed on Sep. 20, 2000.

(30) Foreign Application Priority Data
Sep. 13, 2000 (JP) .................................. P2000-278286

(51) Int. Cl.[7] .................................................. G02B 6/34
(52) U.S. Cl. ....................................................... 385/37
(58) Field of Search .............................. 385/37, 14, 24

(56) References Cited

U.S. PATENT DOCUMENTS

| | | | |
|---|---|---|---|
| 5,002,350 A | | 3/1991 | Dragone |
| 5,706,377 A | * | 1/1998 | Li ................................ 385/37 |
| 5,889,906 A | * | 3/1999 | Chen ........................... 385/28 |
| 6,069,990 A | * | 5/2000 | Okawa et al. ................ 385/43 |
| 6,195,481 B1 | * | 2/2001 | Nakajima et al. ............. 385/24 |
| 6,195,482 B1 | * | 2/2001 | Dragone ...................... 385/28 |
| 6,539,150 B2 | * | 3/2003 | van Weerden et al. ........ 385/39 |
| 6,563,988 B2 | * | 5/2003 | McGreer ...................... 385/43 |
| 2002/0150338 A1 | * | 10/2002 | Hosoi ........................... 385/37 |

FOREIGN PATENT DOCUMENTS

| | | |
|---|---|---|
| EP | 0881512 A2 | 12/1998 |
| JP | 09-297338 | 11/1997 |
| JP | 11-160556 | 6/1999 |

OTHER PUBLICATIONS

M.R. Amersfoort, J.B.D. Soole, H.P. Leblanc, N.C. Andreadakis, A. Rajhel, and C. Caneau, "Passband Broadening of Integrated Arrayed Waveguide Filters Using Multimode Interference Couplers," Electronics Letters, Feb. 29, 1996, vol. 32, No. 5, pp. 449–451.

* cited by examiner

Primary Examiner—Rodney Bovernick
Assistant Examiner—Mike Stahl
(74) Attorney, Agent, or Firm—McDermott, Will & Emery

(57) ABSTRACT

The present invention is related to an optical multiplexer/demultiplexer having a structure capable of allowing higher manufacturing tolerance for attainment of improvement in transmission wavelength characteristics. In the optical multiplexer/demultiplexer, a free propagation area for improvement in the transmission wavelength characteristics is provided between an input waveguide and a first slab waveguide. This free propagation area has a first portion increasing its width from the input waveguide toward the first slab waveguide and a second portion having the width larger than that of the input waveguide. The first portion once broadens an electric field strength distribution of light traveling from the input waveguide to the first slab waveguide, and the second portion restricts the broadening on the other hand. This makes change of the electric field strength distribution less susceptible to change of the waveguide width, so as to relax required accuracy for microprocessing as a result.

10 Claims, 13 Drawing Sheets

OPTICAL MULTIPLEXER/DEMULTIPLEXER

CROSS-REFERENCE TO RELATED APPLICATION

This application claims priority to Provisional Application Serial No. 60/234,188 filed Sep. 20, 2000, which is/are hereby incorporated by reference in its/their entirety.

BACKGROUND OF THE INVENTION

1. Field of the Invention

The present invention relates to an arrayed waveguide grating (AWG: Arrayed Waveguide Grating) type optical multiplexer/demultiplexer applicable as a wavelength selection element to wavelength division multiplexing (WDM: Wavelength Division Multiplexing) transmission systems.

2. Related Background Art

The AWG type optical multiplexer/demultiplexers (hereinafter referred to as AWG circuits) are widely applied to the wavelength selection elements in the WDM transmission systems, as wavelength filters enabling extraction or insertion of a specific wavelength by interference. The AWG circuits do not require so precise machining as required by diffraction gratings or so precise multilayer film formation as required by interference films, but they can be constructed by ordinary microprocessing such as lithography, etching, and so on. Therefore, the AWG circuits are expected to develop into dominant optical components in the future WDM transmission systems, also including the possibility of integration with other light waveguide elements.

Such AWG circuits have the structure in which an input waveguide, an input slab waveguide, channel waveguides (phased array) of mutually different lengths, an output slab waveguide, and output waveguides are integrated on a single substrate.

A variety of improvements have been proposed heretofore in the conventional AWG circuits and, for example, in order to decrease loss variation among signal channels (for flattening of passband), M. R. Amersfoort, et al., "Passband broadening of integrated arrayed waveguide filters using multimode interference couplers," ELECTRONICS LETTERS 29th February, 1996, Vol. 32, No. 5 discloses the AWG circuit provided with a multimode interference coupler (MMI coupler: MultiMode Interference coupler, which will be referred to hereinafter as an MMI coupler) of the shape as illustrated in FIG. 12A, in the connection part between the input waveguide and the input slab waveguide (a first conventional example). Japanese Patent Application Laid-Open No. H09-297228 discloses the AWG circuit provided with a parabolic shape waveguide as illustrated in FIG. 13A, in the connection part between the input waveguide and the input slab waveguide (a second conventional example). Further, Japanese Patent No. 3039491 discloses the AWG circuit provided with a waveguide formed in the structure of combination of a tapered waveguide with a parabolic waveguide in the connection part between the input waveguide and the input slab waveguide (a third conventional example).

SUMMARY OF THE INVENTION

The inventor investigated the conventional AWG circuits of the structures as described above (the first to third conventional examples) and found out the following problems. Namely, the AWG circuit of the first conventional example is provided with the MMI coupler of the rectangular shape as illustrated in FIG. 12A, in the connection part between the input waveguide and the input slab waveguide. In this AWG circuit of the first conventional example, an electric field strength distribution of light having propagated through the input waveguide is badly disturbed during propagation in the MMI coupler, as illustrated in FIG. 12B, even if the MMI coupler is precisely processed. This disturbance of the electric field strength distribution is mainly caused by multiple reflection in the MMI coupler and much higher accuracy is required in processing for the width, length, etc. of the MMI coupler in order to achieve stable optical characteristics among the AWG circuits to be fabricated.

On the other hand, every AWG circuit of the above second conventional example is provided with the parabolic waveguide as illustrated in FIG. 13A. In this AWG circuit, the electric field strength distribution of light propagating in the parabolic waveguide is rarely disturbed, as illustrated in FIG. 13B, because the effect of multiple reflection is reduced in the parabolic waveguide. However, the electric field strength distribution of the propagating light becomes broadening according to the propagation in the parabolic waveguide (i.e., the peak-to-peak separation of the electric field strength distribution gradually increases). Since the parabolic waveguide has the small slope dy/dx (where the y-axis is taken along the longitudinal direction of the parabolic waveguide and the x-axis along the normal direction to the longitudinal direction in FIG. 12A) of the side faces even near the optical output end face thereof, variation can occur among the optical characteristics of the respective AWG circuits produced without attainment of sufficient processing accuracy or the like even in this second conventional example. This also applies to the AWG circuit of the third conventional example provided with the similar parabolic waveguide.

The present invention has been accomplished in order to solve the problems as described above and an object of the invention is to provide an optical multiplexer/demultiplexer having structure capable of relaxing the processing accuracy or the like required for realizing improvement in transmission wavelength characteristics, such as decrease in the loss variation among the signal channels or the like, i.e., structure capable of realizing higher manufacturing tolerance.

An optical multiplexer/demultiplexer according to the present invention comprises a substrate, at least one input waveguide provided on the substrate, a first slab waveguide, a plurality of channel waveguides, a second slab waveguide, and a plurality of output waveguides provided corresponding to respective signal channels, and is an AWG optical multiplexer/demultiplexer applicable as a wavelength selection element to the WDM transmission systems.

In the optical multiplexer/demultiplexer according to the present invention, each of the first and second slab waveguides has a predetermined slab length. The slab length is normally equivalent to a focal length of an optical input end functioning as a lens surface of each slab waveguide. The input waveguide is a waveguide for guiding signals of channel wavelengths set as signal channels at predetermined wavelength intervals, each to the first slab waveguide, and an optical output end thereof is connected to an optical input end face of the first slab waveguide. The channel waveguides are waveguides of mutually different lengths and are flatly arrayed on the substrate in a state in which optical input ends of the respective channel waveguides are connected to an optical output end face of the first slab waveguide so as to place the first slab waveguide between the input waveguide and the channel waveguides while optical output ends of the respective channel waveguides are connected to an optical input end face of the second slab waveguide so as to place the second slab waveguide between the channel waveguides and the output waveguides. Further, the above output waveguides are waveguides flatly arrayed on the substrate in a state in which optical input ends thereof are connected to an optical output end face of the second slab waveguide and are waveguides for individually taking out the signals of the channel waveguides set at the predetermined wavelength intervals.

Particularly, the optical multiplexer/demultiplexer according to the present invention comprises a waveguide provided between the input waveguide and the first slab waveguide, said waveguide being a free propagation area for coupling part of the fundamental mode of light having propagated through the input waveguide, to a higher order mode. This free propagation area is comprised of a first portion having side faces which extend along predetermined curves so as to increase width from an optical output end of the input waveguide toward an optical input end face of the first slab waveguide, and a second portion provided between the first portion and the first slab waveguide and having width larger than that of the input waveguide. Therefore, the first portion functions to broaden the electric field strength distribution of the light propagating from the optical output end of the input waveguide toward the optical input end face of the first slab waveguide by diffraction. On the other hand, the second portion is a waveguide having side faces nearly parallel to each other, which functions to limit the broadening of the electric field strength distribution of the light having passed through the first portion. When the free propagation area located between the input waveguide and the first slab waveguide is comprised of the first and second portions having the structures as described above, the tolerance of manufacturing errors necessary for attainment of desired optical characteristics, for example, for attainment of improvement in the transmission wavelength characteristics (e.g., reduction of the loss variation among the signal channels) becomes wider, so as to relax the required accuracy for microprocessing or the like.

The predetermined curves are preferably curves represented by exponential functions. Particularly, when the second portion is also processed so that its side faces extend along these curves, the free propagation area can be formed as a waveguide having continuous side faces. In this case, the side faces of the free propagation area go into almost parallel relation with distance from the optical input end face of the free propagation area, so that the input-waveguide side of the free propagation area functions as the first portion while the first-slab-waveguide side of the free propagation area as the second portion.

The above curves are given, for example, by the following equations. Namely, in an x-z coordinate system agreeing with a surface of the substrate, a reference line Xp(z) passing each of center points $(x_s, z_s)$, $(x_e, z_e)$ in an optical input end face and an optical output end face of the first portion being surfaces parallel to the x-axis, is given by the following equation:

$$Xp(z) = x_s + \frac{x_e - x_s}{z_e - z_s}(z - z_s),$$

the width w(z) of the first portion parallel to the x-axis is given by the following equation:

$$w(z) = w_s + A\left(\exp\left(-\alpha\frac{z - z_s}{z_e - z_s}\right) - 1\right), \quad A = \frac{w_e - w_s}{\exp(-\alpha) - 1}$$

$w_s$: the width of the optical input end face of the first portion,
$w_e$: the width of the optical output end face of the first portion,
α: an exponential coefficient, and under the above conditions the curves are given by the following equations (see FIG. 4):

$$x_l(z) = x_p(z) - \frac{w(z)}{2}, \quad x_n(z) = x_p(z) + \frac{w(z)}{2}.$$

In this case, where the free propagation area is integrally processed so that the side faces of the first and second portions all extend along the curves defined as described above, i.e., where $w_e$ is the width of the optical output end face of the free propagation area, a portion with the width in the range of $(1-\Delta)w_e$ to $w_e$ (a portion in which absolute values of slopes dz/dx of the above curves are not less than $w_e/\lambda_0$ where the normal direction to the optical input end face of the first slab waveguide agrees with the z-axis) functions as the second portion. Here Δ represents an infinitesimal change rate given by scalar quantity $\lambda_0/w_e$, where $\lambda_0$ is the center channel wavelength.

Further, it is preferable in the optical multiplexer/demultiplexer of the present invention that a relative refractive-index difference between cores corresponding to the waveguides (including the above-stated input waveguide, free propagation area, first and second slab waveguides, channel waveguides, output waveguides, and so on) provided on the substrate and a cladding provided on the substrate so as to cover the cores be not less than 1%. In addition, the input waveguide, the channel waveguides, and the output waveguides all preferably have the width (core width) of not more than 5.5 µm. The reason is that it increases the optical confinement effect of light into the cores (corresponding to the respective waveguides) and more relaxes the required accuracy for microprocessing etc. of the free propagation area and the like. In addition, the improvement in the optical confinement effect permits the core width to be decreased more, and this makes it possible to provide more channel waveguides on the substrate. The optical multiplexer/demultiplexer can be obtained with excellent optical characteristics, because the theoretically minimum spacing between adjacent cores, which is a constraint on the production process, so called "embedding limit," can be made smaller.

The optical multiplexer/demultiplexer according to the present invention may further comprise an MMI coupler provided between the optical output end of the input waveguide and an optical input end of the first portion in the free propagation area. This structure permits the required accuracy for microprocessing or the like to be relaxed more when compared with the conventional, optical multiplexer/demultiplexers and also permits further improvement in the transmission wavelength characteristics of the optical multiplexer/demultiplexer.

In either of the structure wherein the free propagation area is provided between the input waveguide and the first slab waveguide and the structure wherein the MMI coupler is provided in addition to the free propagation area, it is preferable that the optical output end of the input waveguide be spaced 2.0 or more µm apart from the optical input end face of the first slab waveguide, i.e., that the total length of either the free propagation area or the free propagation area plus the MMI coupler be not less than 2.0 μm. This can restrain work bluntness easy to occur in the connection part between the free propagation area and the first slab waveguide (bluntness of the shape both in the vicinity of the optical output end face of the free propagation area and in the vicinity of the optical input end face of the first slab waveguide forming the connection part) and also permit production of the free propagation area with good embeddability of cladding into gaps between the cores by making use of the CVD (Chemical Vapor Deposition) technology and FHD (Flame Hydrolysis Deposition) technology.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
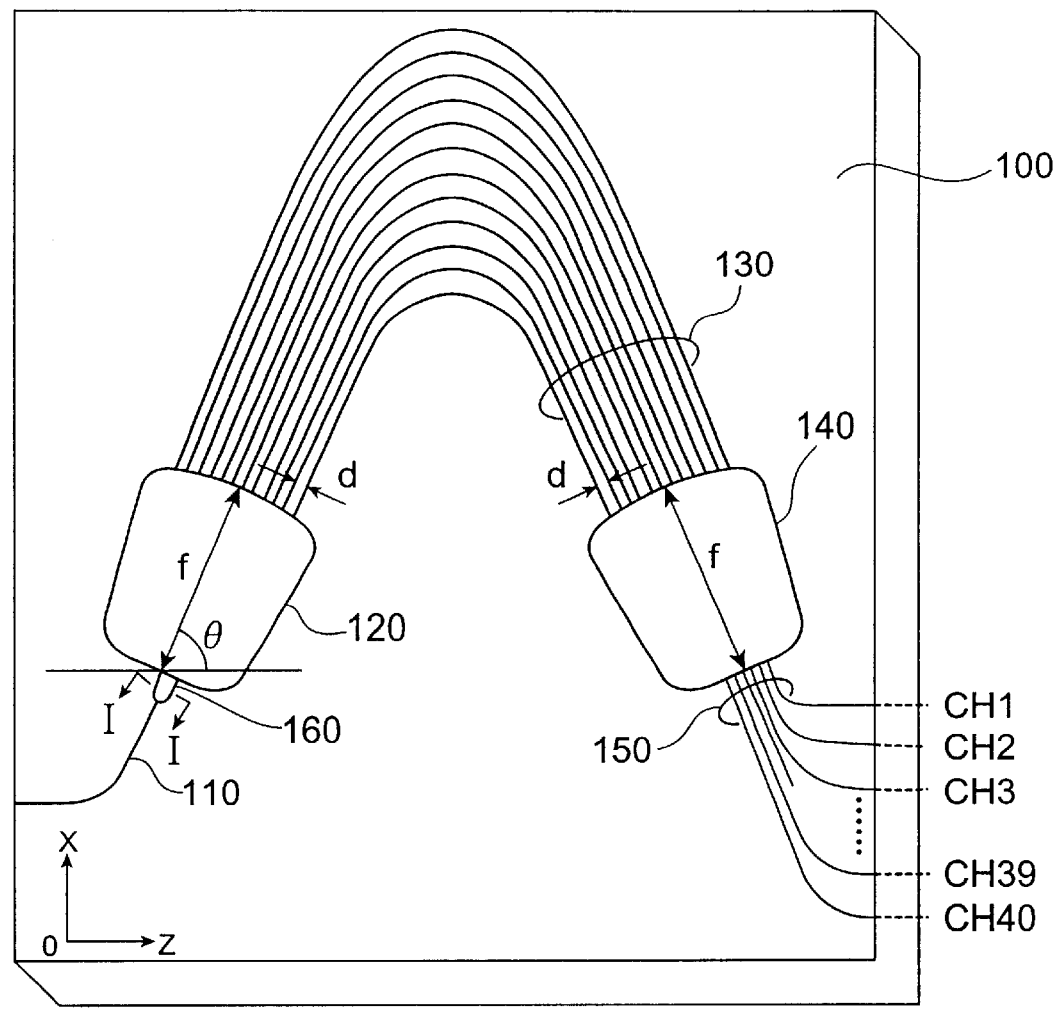
FIG. 1 is a plan view to show the structure of the optical multiplexer/demultiplexer according to the present invention.

Each of embodiments of the optical multiplexer/demultiplexer according to the present invention will be described hereinafter with reference to FIG. 1 to FIG. 11. In the drawings, the same portions will be denoted by the same numerals and redundant description will be omitted.

FIG. 1 is a plan view to show the structure of the optical multiplexer/demultiplexer according to the present invention. As illustrated in this FIG. 1, the optical multiplexer/demultiplexer is an optical component in which optical waveguide portions are integrally made on a silica glass substrate 100. Specifically, there are at least one input waveguide 110, a first slab waveguide 120 (input slab waveguide), a plurality of channel waveguides 130, a second slab waveguide 140 (output slab waveguide), and a plurality of output waveguides 150 provided on the substrate 100. Particularly, the optical multiplexer/demultiplexer according to the present invention is characterized by provision of the free propagation area 160 of the special shape between the input waveguide 110 and the first slab waveguide 120.

The first slab waveguide 120 is placed at an angle θ relative to the angle of incidence of light into the optical multiplexer/demultiplexer and the first and second slab waveguides 120, 140 have the slab length f. The slab length is equal to the focal length of a convex lens surface on the optical input end face in each of the first and second slab waveguides 120, 140. The input waveguide 110 is a waveguide for guiding each of the signals of the channel wavelengths set as signal channels at predetermined wavelength intervals, to the first slab waveguide 120, and the optical output end of this input waveguide 110 is connected to the optical input end face of the first slab waveguide 120. The channel waveguides 130 are waveguides of mutually different lengths, which are flatly arrayed on the substrate 100. These channel waveguides 130 are connected so that the optical input ends thereof are connected as spaced at the intervals d to the optical output end face of the first slab waveguide 120 so as to place the first slab waveguide 120 between the channel waveguides 130 and the input waveguide 110 and so that the optical output ends thereof are connected as spaced at the intervals d to the optical input end face of the second slab waveguide 140 so as to place the second slab waveguide 140 between the channel waveguides 130 and the output waveguides 150. Further, the output waveguides 150 are waveguides flatly arrayed on the above substrate 100 in a state in which the optical input ends thereof are connected to the optical output end face of the second slab waveguide 140, which are provided corresponding to the respective signals of the channel waveguides set at the predetermined wavelength intervals, i.e., corresponding to the respective signal channels. The optical multiplexer/demultiplexer illustrated in FIG. 1 is described as the AWG circuit which implements signal separation of 40 channels and in which light propagates in the order of the input waveguide 110, the first slab waveguide 120, the channel waveguides 130, the second slab waveguide 140, and the output waveguides 150, but an AWG circuit for implementing multiplexing of signals can also be substantiated by providing a plurality of input waveguides corresponding to the respective signal channels.

(First Embodiment)

Figure 2:
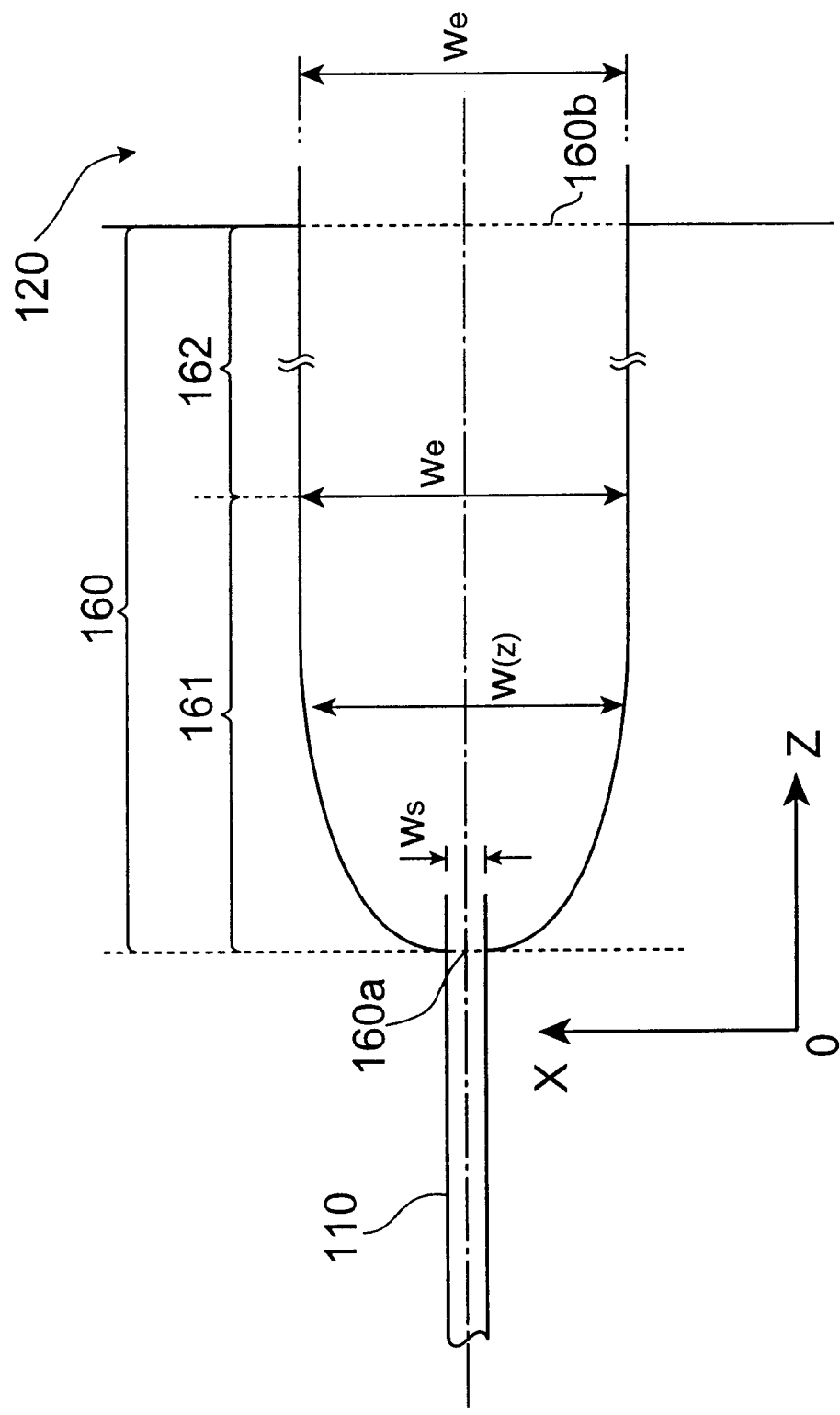
FIG. 2 is a plan view to show the waveguide structure mainly in the light input part as the first embodiment of the optical multiplexer/demultiplexer according to the present invention.

FIG. 2 is a plan view to show the waveguide structure of the light input part (corresponding to the light input part of FIG. 1) in the first embodiment of the optical multiplexer/demultiplexer according to the present invention. In the optical multiplexer/demultiplexer according to this first embodiment, the free propagation area 160 functions as a waveguide for coupling part of the fundamental mode of the light having propagated through the input waveguide 110, to a higher order mode. The free propagation area 160 is comprised of a first portion 161 for broadening the electric field strength distribution of the light having propagated through the input waveguide 110 and a second portion 162 for limiting the broadening of the electric field strength distribution of the light having propagated through the first portion.

The shape of the free propagation area 160 illustrated in FIG. 2 is a projection onto an x-z coordinate plane (which agrees with the surface of the substrate 100) having the z-axis along the normal direction to the optical input end face of the first slab waveguide 120 and the x-axis along the direction perpendicular to the normal. The first portion 161 has the optical input end face (which agrees with the optical input end face 160a of the free propagation area 160) of the width $w_s$ facing the optical output end face of the input waveguide 110 and the optical output end face of the width $w_e$, and the side faces thereof extend along the predetermined curves so as to increase the width w(z). On the other hand, the second portion 162 has the optical input end face facing the optical output end face of the first portion 161 and the optical output end face (which agrees with the optical output end face 160b of the free propagation area 160) facing the optical input end face of the first slab waveguide 120, and the side faces thereof extend almost in parallel to each other in the width we. When the free propagation area 160 is comprised of the above first and second portions 161, 162 as described above, the tolerance of manufacturing errors necessary for attainment of the desired optical characteristics, for example, for attainment of improvement in the transmission wavelength characteristics (the decrease of the loss variation among the signal channels), becomes wider, so as to relax the required accuracy for microprocessing or the like.

Figure 3:
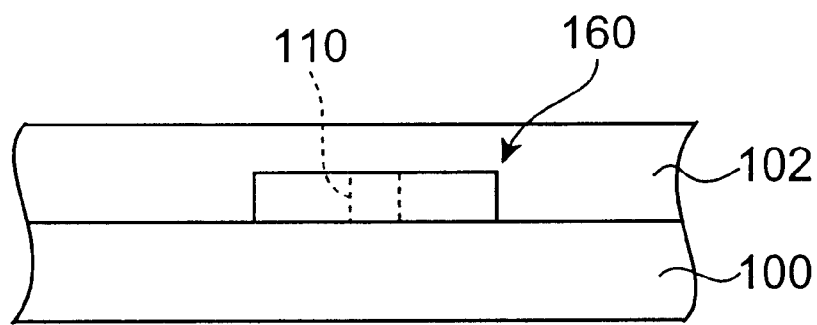
FIG. 3 is a drawing to show the cross-sectional structure of the optical multiplexer/demultiplexer along the line I—I illustrated in FIG. 1.

FIG. 3 is a diagram to show the cross-sectional structure of the optical multiplexer/demultiplexer, particularly, in the vicinity of the free propagation area 160 along the line I—I in FIG. 1, and on the silica glass substrate 100 there are cores corresponding to the input waveguide 110, first slab waveguide 120, channel waveguides 130, second slab waveguide 140, output waveguides 150, and free propagation area 160, and a cladding 102 covering the cores. The cores functioning as waveguides are doped with $GeO_2$ and the doping amount of $GeO_2$ is determined so that the relative index difference between the cores and the cladding is not less than 1%, in order to enable decrease in the radius of curvature of the channel waveguides 130 and decrease in the spacing between the waveguides (for increase in optical confinement efficiency). The substrate 100 can also be a structure consisting of a silicon substrate and a glass layer deposited on the silicon substrate, instead of the silica glass substrate. Similar action and effect can also be achieved by forming the cores (waveguides) doped with $GeO_2$ on this glass layer.

In the first embodiment, the free propagation area 160 is formed as a waveguide having continuous side faces by processing both the first portion 161 and the second portion 162 so that the side faces thereof extend along curves represented by exponential functions. In this case, since the side faces of the free propagation area 160 go into almost parallel relation with distance from the optical input end face 160a of the free propagation area 160, the part of the free propagation area 160 on the side of input waveguide 110 functions as the first portion 161 while the part of the free propagation area 160 on the side of first slab waveguide 120 as the second portion 162.

Figure 4:
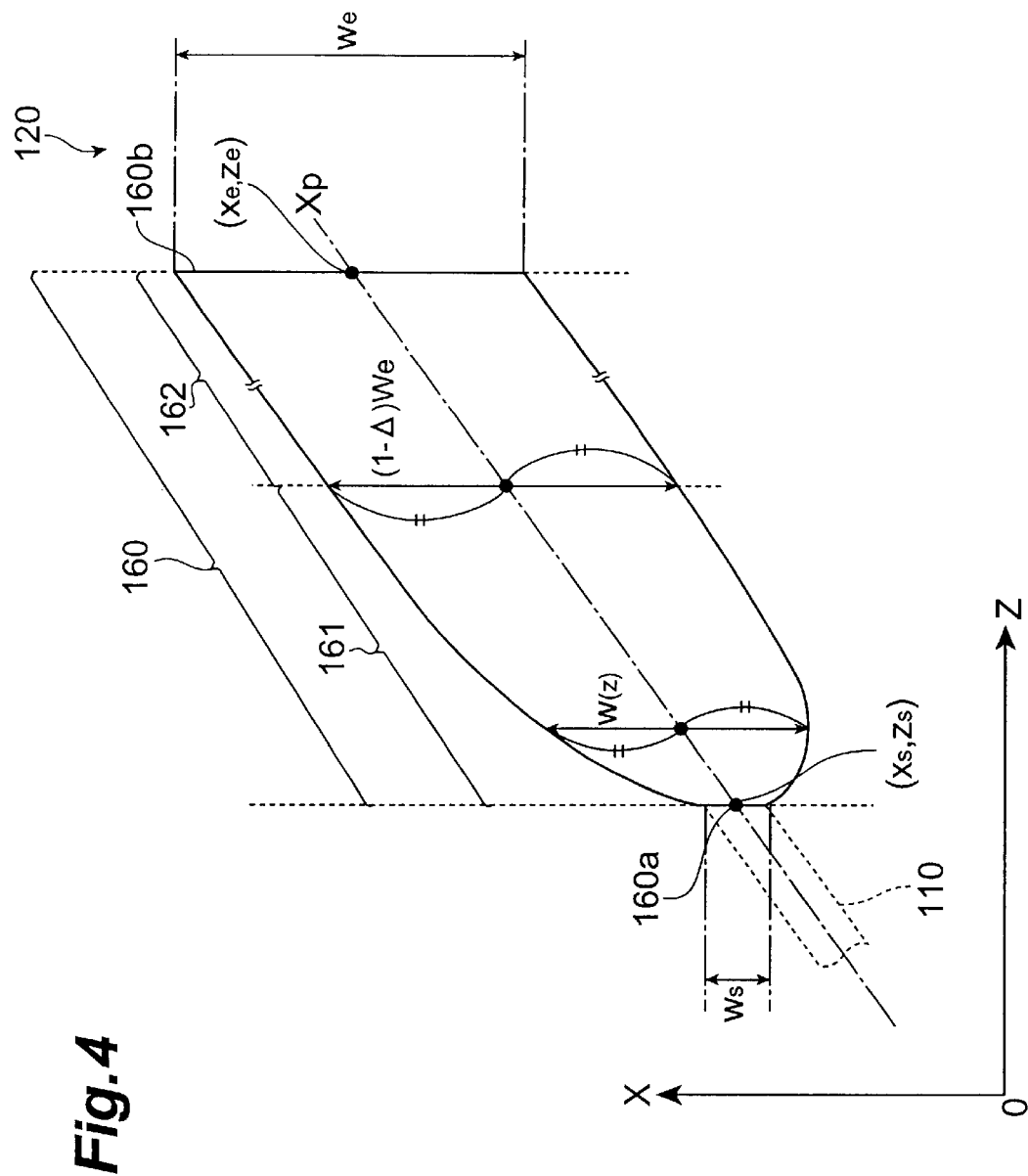
FIG. 4 is a drawing for explaining an example of the shape of the free propagation area.

FIG. 4 is a diagram for explaining an example of the above curves. The shape of the free propagation area 160 illustrated in this figure is a projection onto the x-z coordinate plane (which agrees with the surface of the substrate 100) having the z-axis along the normal direction to the optical input end face of the first slab waveguide 120 and the x-axis along the direction perpendicular to the normal. In the free propagation area 160 illustrated in FIG. 4, the center axis thereof is inclined at a predetermined angle relative to the optical input end face of the first slab waveguide 120. FIG. 2 shows the free propagation area 160 the center axis of which is perpendicular to the optical input end face of the first slab waveguide 120.

Specifically, in the x-z coordinate system agreeing with the surface of the substrate 100, a reference line Xp(z) passing each of center points $(x_s, z_s)$, $(s_e, z_e)$ in the optical input end face 160a (agreeing with the optical input end face of the first portion 161) and the optical output end face 160b (agreeing with the optical output end face of the second portion 162) of the free propagation area 160, which are surfaces parallel to the x-axis, is given by the following equation:

$$Xp(z) = x_s + \frac{x_e - x_s}{z_e - z_s}(z - z_s),$$

the width w(z) of the free propagation area 160 parallel to the x-axis is given by the following equation:

$$w(z) = w_s + A\left(\exp\left(-\alpha\frac{z - z_s}{z_e - z_s}\right) - 1\right), \ldots A = \frac{w_e - w_s}{\exp(-\alpha) - 1}$$

$w_s$: the width of the optical input end face 160a of the free propagation area 160,
$w_e$: the width of the optical output end face 160b of the free propagation area 160,
$\alpha$: the exponential coefficient,
and the curves defining the shape of the side faces of the free propagation area 160 are given by the following equations:

$$x_l(z) = x_p(z) - \frac{w(z)}{2}, \quad x_n(z) = x_p(z) + \frac{w(z)}{2}.$$

In this case, the region from the optical input end face 160a of the free propagation area 160 to the x-directional width of $(1-\Delta)w_e$ corresponds to the first portion 161, and the region of the x-directional width ranging from $(1-\Delta)w_e$ to $w_e$ corresponds to the second portion 162. When the z-axis agrees with the normal direction to the optical input end face of the first slab waveguide 120, the region up to the point where the absolute value of the slope dz/dx of each of the above curves $X_l(z)$ and $X_u(z)$ is $w_e/\lambda_0$, corresponds to the first portion 161, and the region where the absolute values of the slope dz/dx are not less than $w_e/\lambda_0$, corresponds to the second portion. Here Δ is an infinitesimal change rate given by the scalar quantity $\lambda_0/w_e$, where $\lambda_0$ is the center channel wavelength (μm).

Next, the inventor designed the AWG circuit enabling separation of 40 channel signals, in which the signal wavelength intervals Δλ were 100 GHz and the center channel wavelength (CH20) was 1.5305 μm.

In the AWG circuit thus designed, the relative refractive-index difference between the substrate 100 and each waveguide part was set to 1.5%, the slab length f to 8000 μm, the width (core width) of each waveguide to 4.3 μm, the slab length of the first and second slab waveguides 120, 140 to 8000 μm, the size of the substrate 100 to 20 mm×20 mm, the thickness of the substrate 100 to 0.5 mm, the intervals d between the ends of the channel waveguides 130 to 12.0 μm, the number of channel waveguides 130 to 180, the placement angle θ of the first slab waveguide 120 to 80°, and the difference in length ΔL among the channel waveguides 130 to 36.702 μm.

Figure 5A:
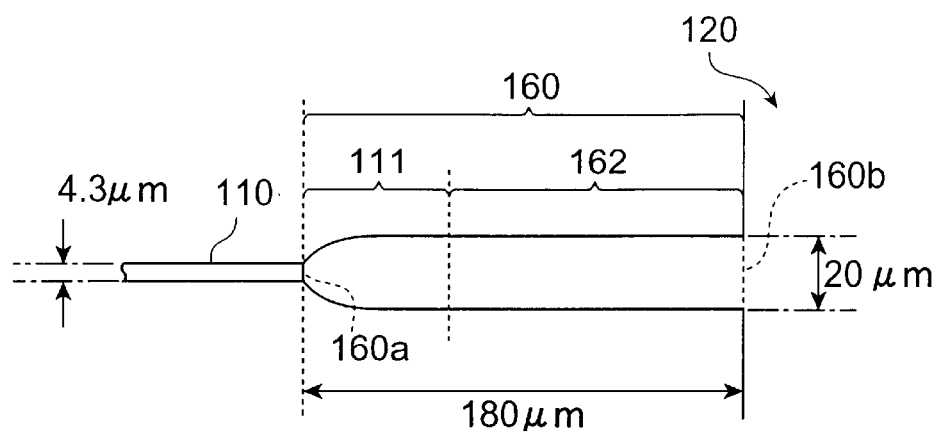
FIGS. 5A and 5B are plan views to show the waveguide structure of the light input part in each of (5A) the sample produced as the first embodiment of the optical multiplexer/demultiplexer according to the present invention and (5B) the sample produced as a comparative example.

The free propagation area 160 in a first sample of the AWG circuit designed as the first embodiment, has the flat shape as illustrated in FIG. 5A and the side faces thereof have the shape extending along the respective curves $X_l(z)$ and $X_u(z)$ given by Eq. 9 where the exponential coefficient α is +1.4, the width $w_s$ of the optical input end face 160a is 4.3 μm, the width we of the optical output end face 160b is 20 μm, and the total length is 180 μm. Since $w_e$ is 20 μm and the center channel wavelength is 1.5305 μm, $\Delta=\lambda_0/w_e=$ 0.076525. In this first sample, therefore, the region from the optical input end face 160a of the width $w_s$ (=4.3 μm) to the width of (1−0.076525)×20 μm corresponds to the first portion 161 of the free propagation area 160, while the region between the position of the width of (1−0.076525)×20 μm to the optical output end face 160b of the width of 20 μm corresponds to the second portion 162 of the free propagation area 160.

Figure 5B:
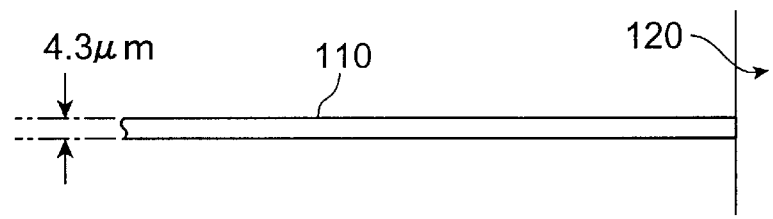

On the other hand, a second sample of the AWG circuit designed as a comparative example has the structure without the free propagation area in which the input waveguide 110 of the width of 4.3 μm is directly connected to the first slab waveguide 120, as illustrated in FIG. 5B.

Figure 6:
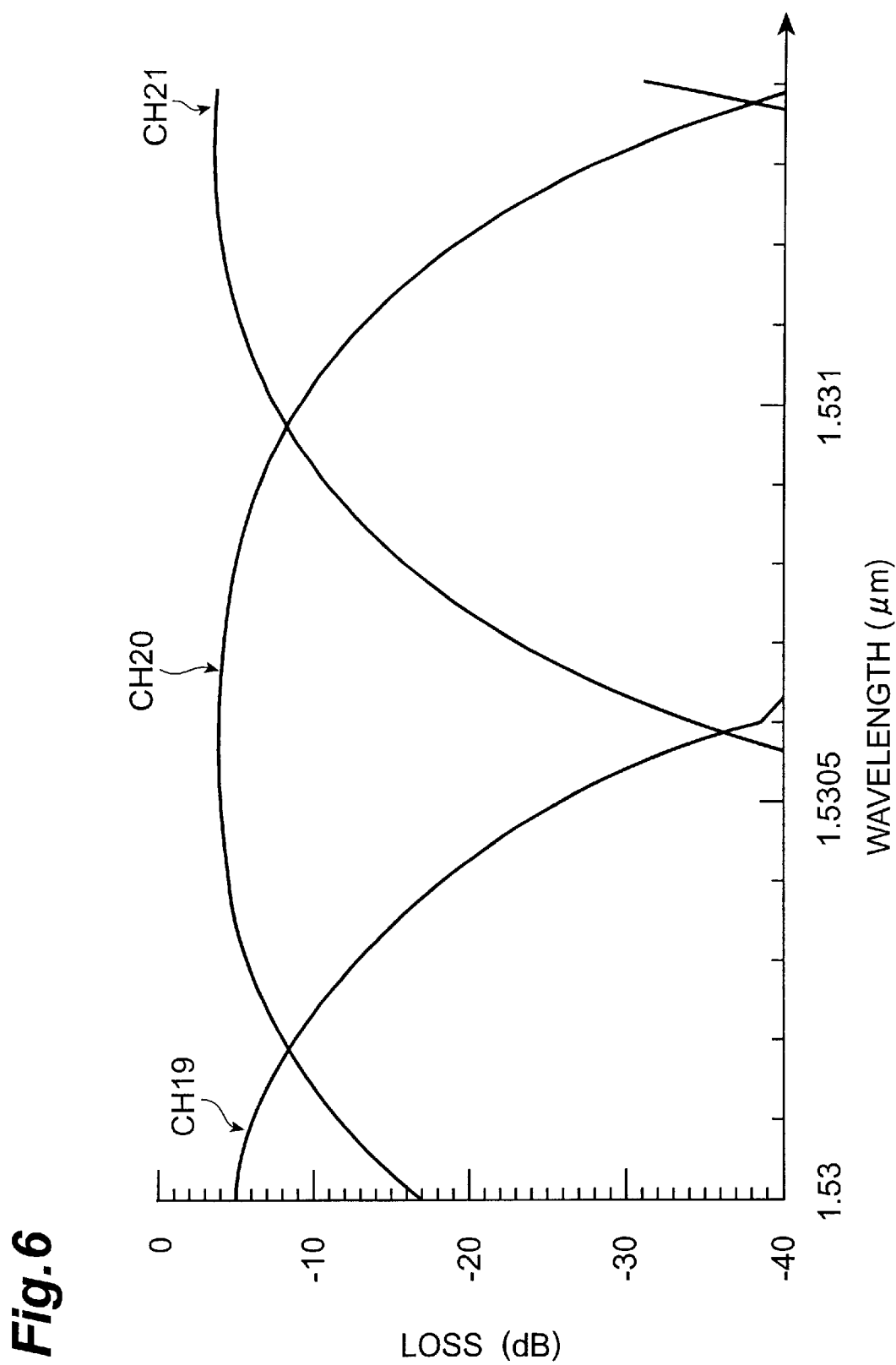
FIG. 6 is loss spectra of the optical multiplexer/demultiplexer of the first embodiment having the waveguide structure illustrated in FIG. 5A.
Figure 7:
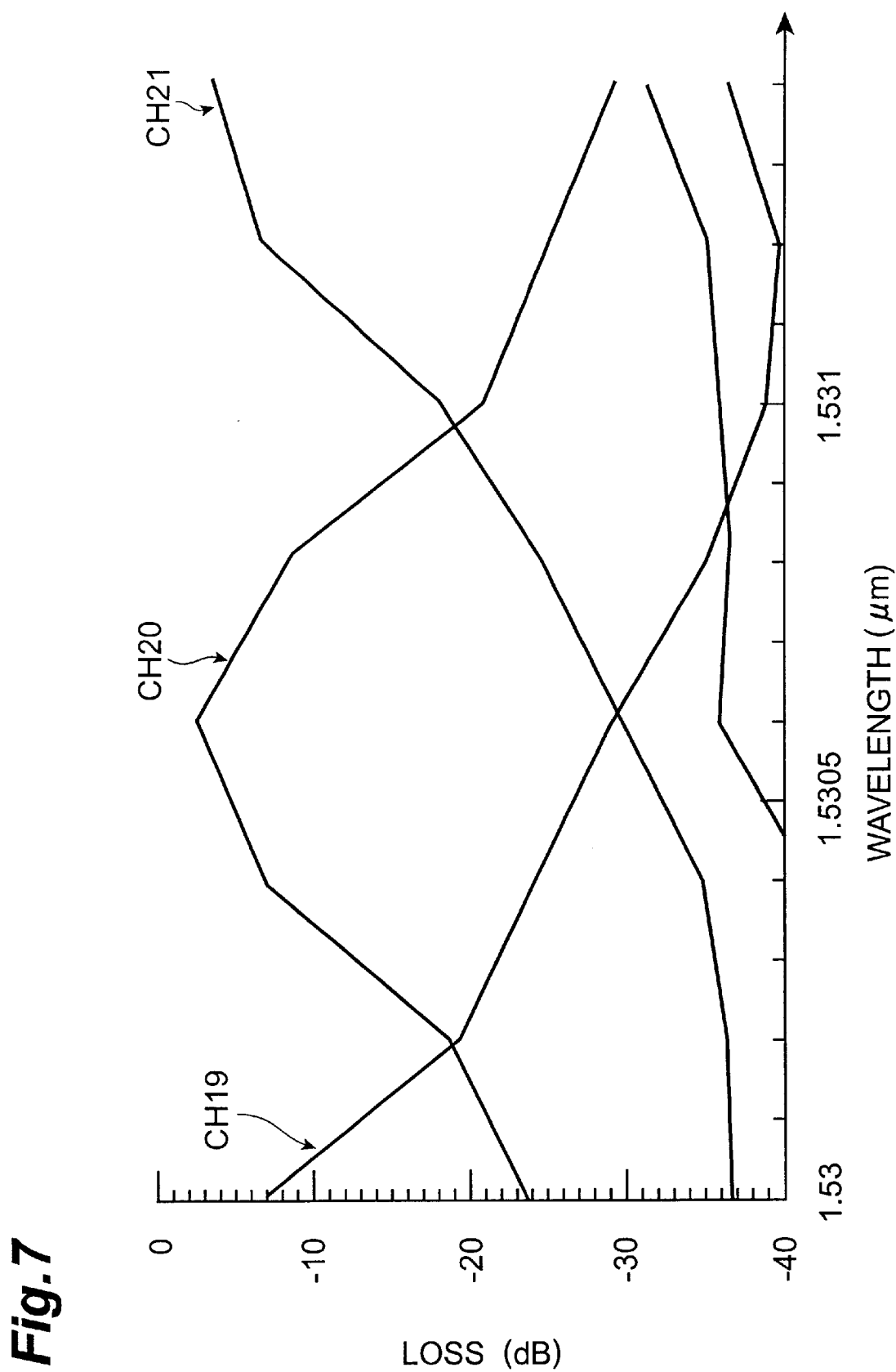
FIG. 7 is loss spectra of the optical multiplexer/demultiplexer of the comparative example having the waveguide structure illustrated in FIG. 5B.

FIG. 6 shows the results of measurement of loss spectra in the respective output waveguides around the center of the twentieth output waveguide (CH20) in the first sample designed as described above. FIG. 7 shows the results of measurement of loss spectra in the respective output waveguides around the center of the twentieth output waveguide (CH20) in the second sample designed as described above. It is seen from comparison between these FIG. 6 and FIG. 7 that the first sample of the first embodiment demonstrates less loss variation among the channel wavelengths.

Next, the relation between manufacturing errors and characteristic change will be described as to the optical multiplexer/demultiplexer of the first embodiment having the structure capable of improvement in the transmission wavelength characteristics, such as the decrease of loss variation among the channels as described above.

In general, production of the AWG circuit involves the possibility of degrading the optical characteristics of the AWG circuit produced, because of dimensional errors (processing errors) in the photolithography step, the etching step, and so on and because of deviation of the relative index difference Δn from the designed value between the cores of the waveguides and the cladding in the film deposition step. This will be qualitatively explained referring to FIG. 8A to FIG. 8C.

Figure 8A:
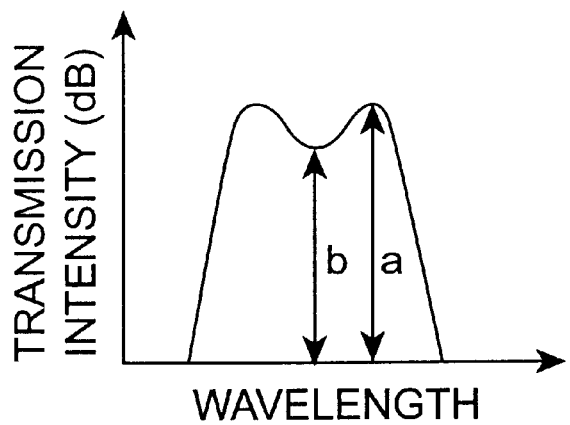
FIGS. 8A to 8C are graphs for explaining the difference among the effects of processing errors in the production process due to the difference in the width (core width) of the waveguide and due to the difference in the relative index difference between the cores and cladding.
Figure 8B:
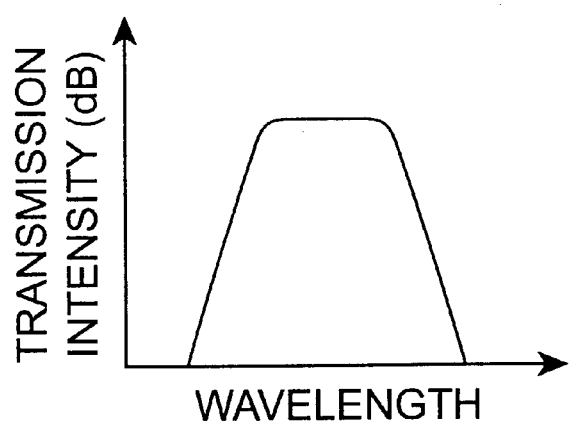
Figure 8C:
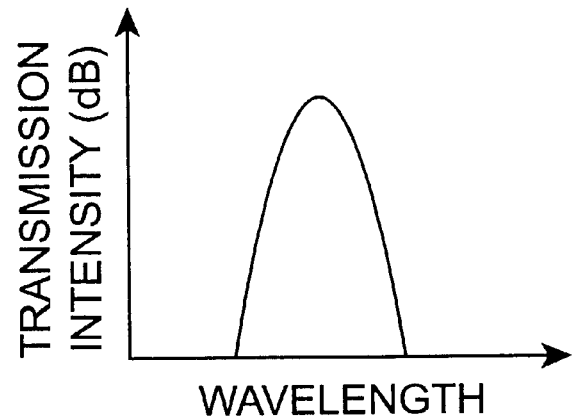

Specifically, with the AWG circuit in which the width of the cores being the waveguides is narrower than the appropriate value and in which the relative index difference Δn is lower than the appropriate value, there appear some peaks, as illustrated in FIG. 8A, in a transmission spectrum in an output waveguide of a certain CH. With the AWG circuit in which the core width and the relative index difference Δn are their appropriate values, the transmission spectrum in the output waveguide of the certain CH becomes flat near the peak, as illustrated in FIG. 8B. On the other hand, with the AWG circuit in which the core width is wider than the appropriate value and in which the relative index difference Δn is higher than the appropriate value, the peak becomes higher, as illustrated in FIG. 8C, in the transmission spectrum in the output waveguide of the certain CH.

As described above, it is not practical to eliminate all the production errors in practical production even in the case of the AWG circuit designed at the appropriate values. Rather, it is more practical to achieve higher tolerance for processing accuracy or the like.

Then the inventor verified the manufacturing tolerance of each of the AWG circuit having the parabolic waveguide described in Japanese Patent Application Laid-Open No. H09-297228 and the AWG circuit of the first embodiment produced under the same conditions as the conventional AWG circuit. The parabolic waveguide in the conventional AWG circuit has the flat shape as illustrated in FIG. 6 of above Japanese Patent Application Laid-Open No. H09-297228 and the structural parameters thereof are as follows; the width of the optical input end face is 7 μm, the parameter A to specify the parabolic shape is 1.0, and the total length is 250 μm. On the other hand, in the AWG circuit of the first embodiment, the free propagation area has the flat shape as illustrated in FIG. 5A and the side faces thereof have the shape extending along the respective $X_l(z)$ and $X_u(z)$ given by Eq. 9 where the exponential coefficient α is +2.1, the width of the optical input end face is 7 μm, the width of the optical output end face is 32 μm, and the total length is 500 μm.

Figure 9:
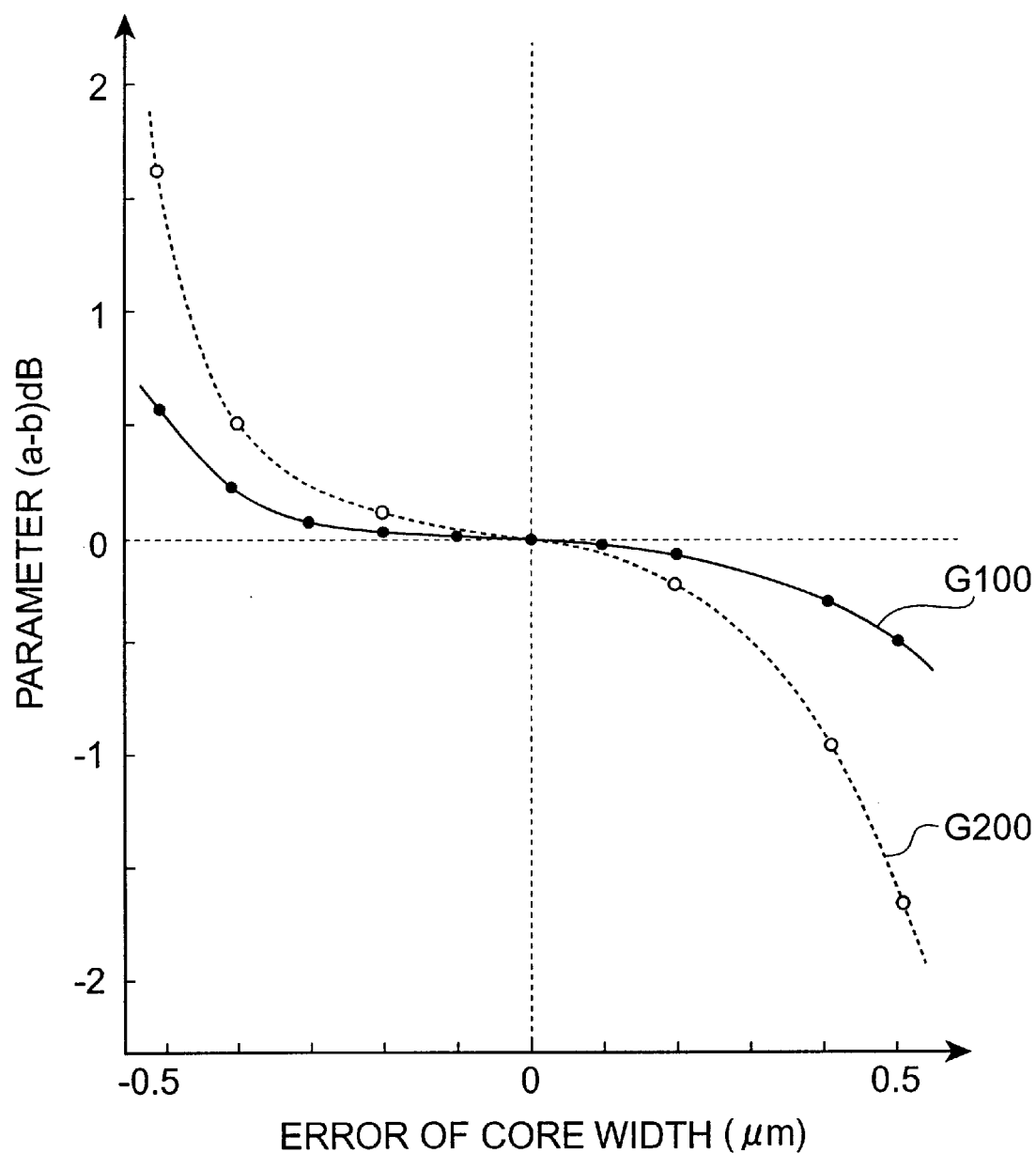
FIG. 9 is a graph to show the effects of processing errors on the transmission wavelength characteristics (measurement results) in each of the optical multiplexer/demultiplexer of the first embodiment and the conventional optical multiplexer/demultiplexer.

FIG. 9 shows the measurement results with the conventional AWG circuit and the AWG circuit of the first embodiment constructed as described above. In this FIG. 9 the axis of abscissa indicates errors (μm) of the width of the cores being the waveguides and the axis of ordinate peak flatness (dB) of transmission spectrum in the output waveguides of CH. The flatness of transmission spectrum is given by difference between transmission intensities a and b illustrated in FIG. 8A. In FIG. 9 the graph G100 represents the measurement results of the AWG circuit of the first embodiment and the graph G200 the measurement results of the conventional AWG circuit.

As also seen from the measurement results illustrated in FIG. 9, it is apparent that the graph G100 has a wider flat range, i.e., higher manufacturing tolerance than the graph G200.

Figure 10A:
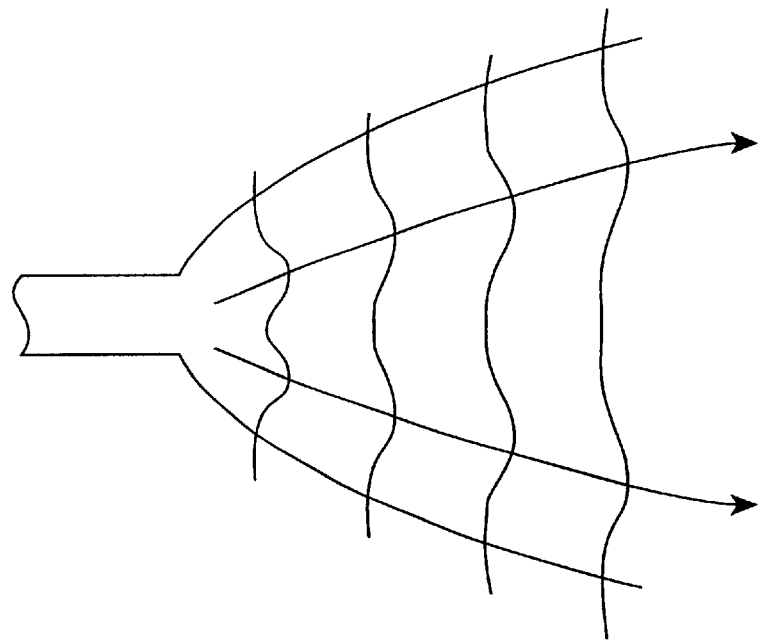
FIGS. 10A and 10B are drawings for explaining the action in the optical multiplexer/demultiplexer according to the present invention.

In the case of the parabolic waveguide in the conventional AWG circuit, since the width of the waveguide part increases from the optical input end face connected to the input waveguide toward the optical output end face connected to the slab waveguide, as illustrated in FIG. 10A, the electric field strength distribution of the light having propagated through the input waveguide becomes broadened with propagation of the light. It is seen from this fact that the parabolic waveguide in the conventional AWG circuit has the structure more susceptible to variation in errors of the waveguide width.

Figure 10B:
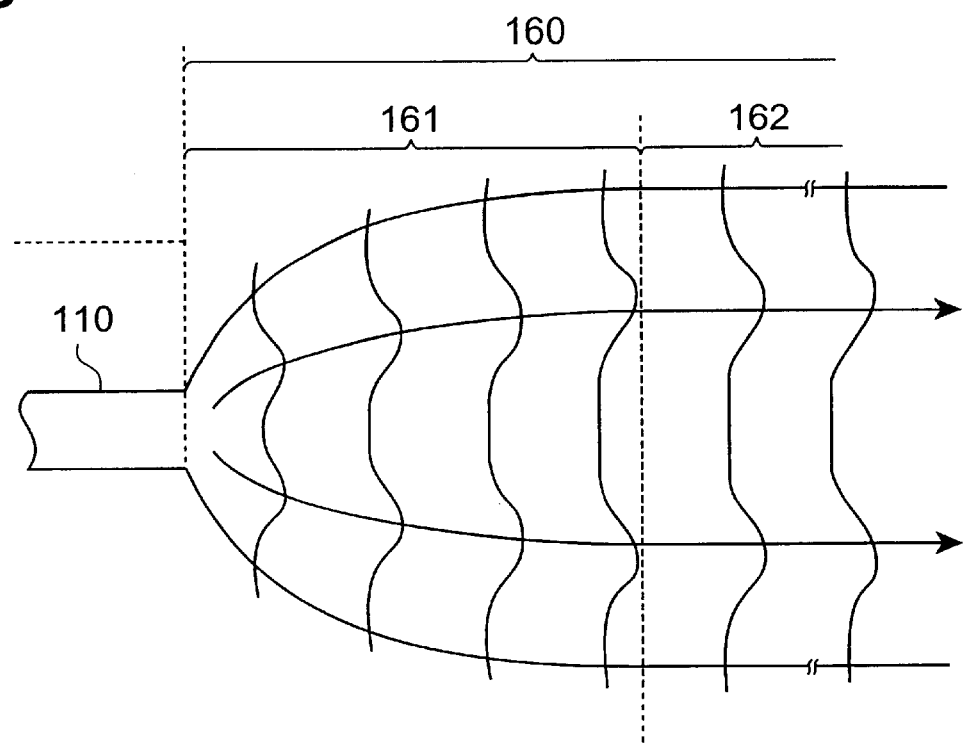

On the other hand, in the AWG circuit of the first embodiment, as illustrated in FIG. 10B, the electric field strength distribution of the light having propagated through the input waveguide 110 is once broadened in the first portion 161 of the free propagation area 160, but the broadening is restricted in the second portion 162. Since variation in the electric field strength distribution of propagating light hardly occurs inherently in the second portion as described above, it is less susceptible to the variation in errors of the waveguide width. It is also seen from this fact that the required accuracy for microprocessing etc. is relaxed much more by the optical multiplexer/demultiplexer according to the present invention than by the conventional technology.

(Second Embodiment)

Figure 11:
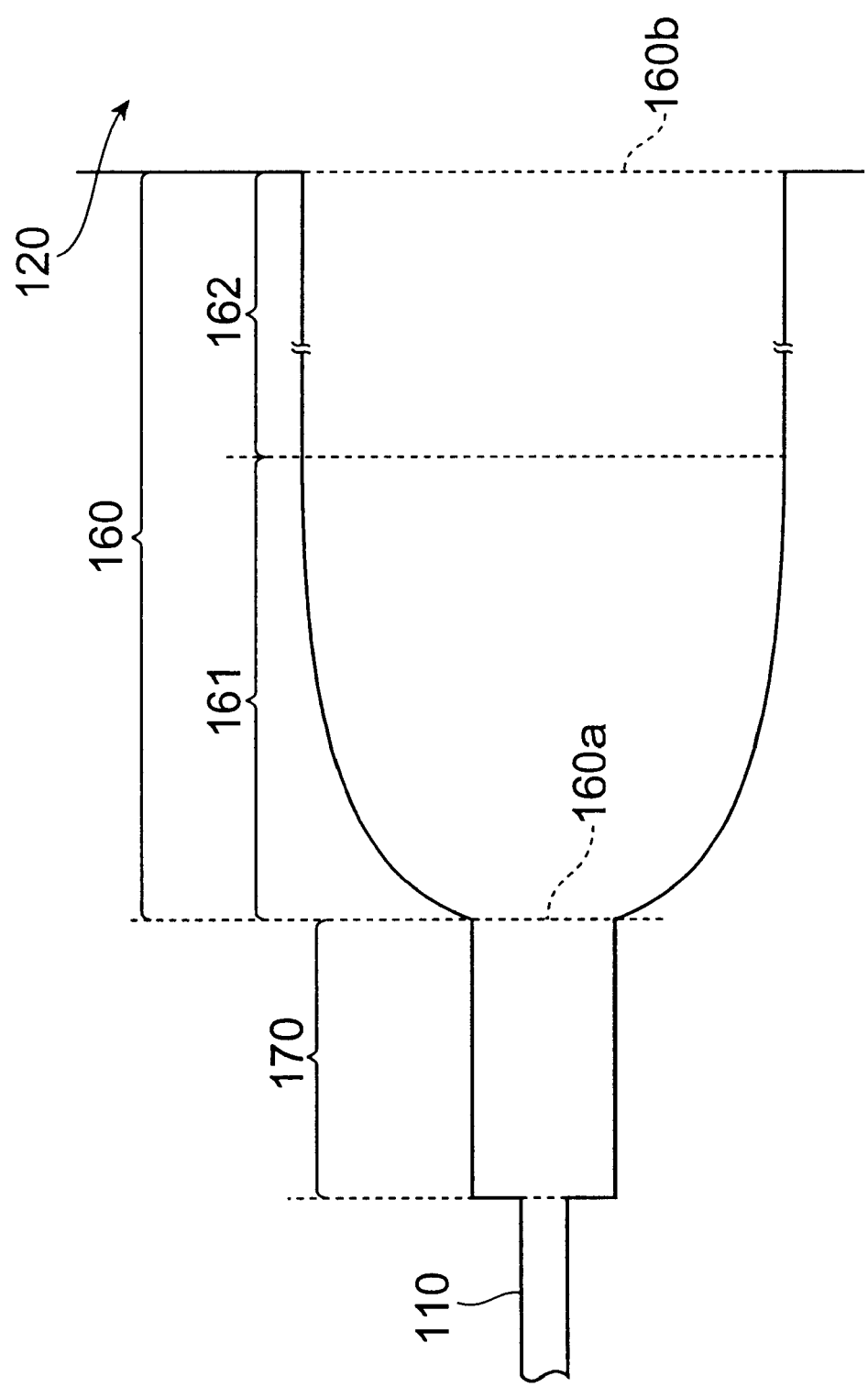
FIG. 11 is a plan view to show the waveguide structure mainly in the light input part as the second embodiment of the optical multiplexer/demultiplexer according to the present invention.
Figure 12A:
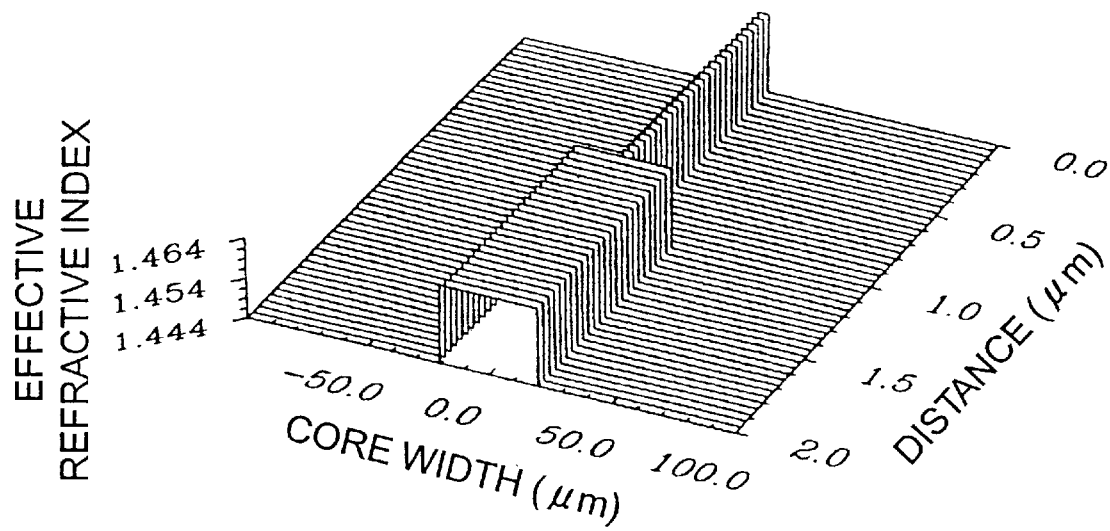
FIGS. 12A and 12B are diagrams to stereoscopically show part of the AWG circuit of the first conventional example and the electric field strength distribution thereof.
Figure 12B:
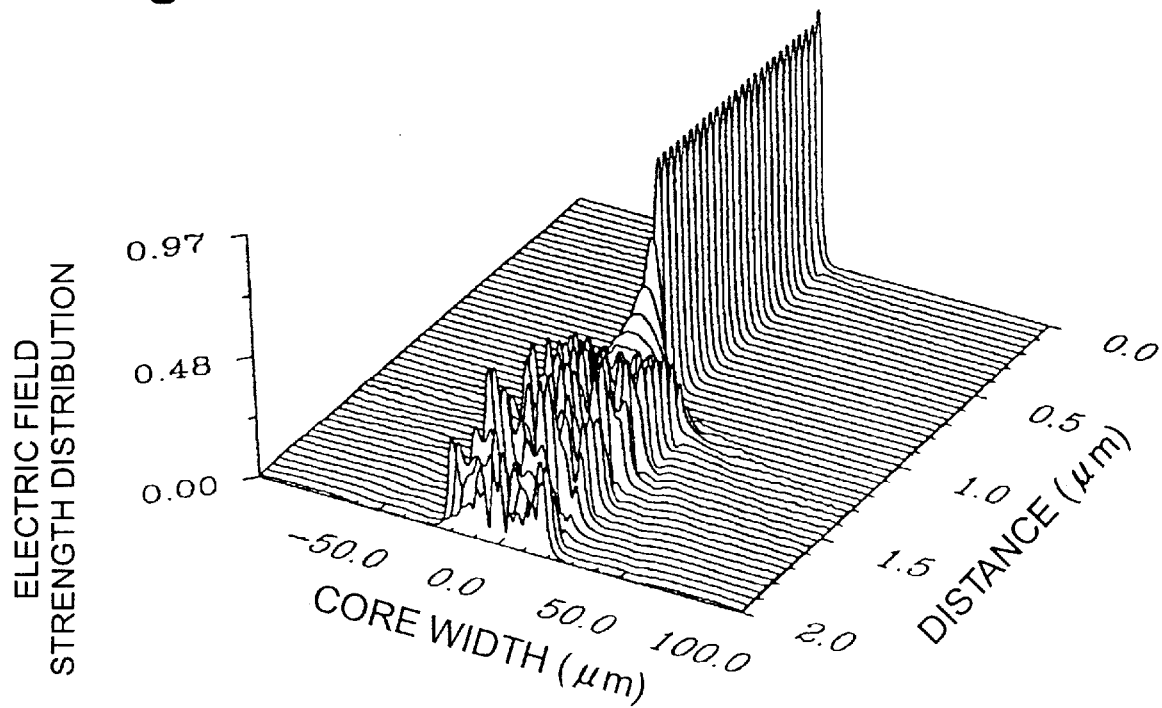
Figure 13A:
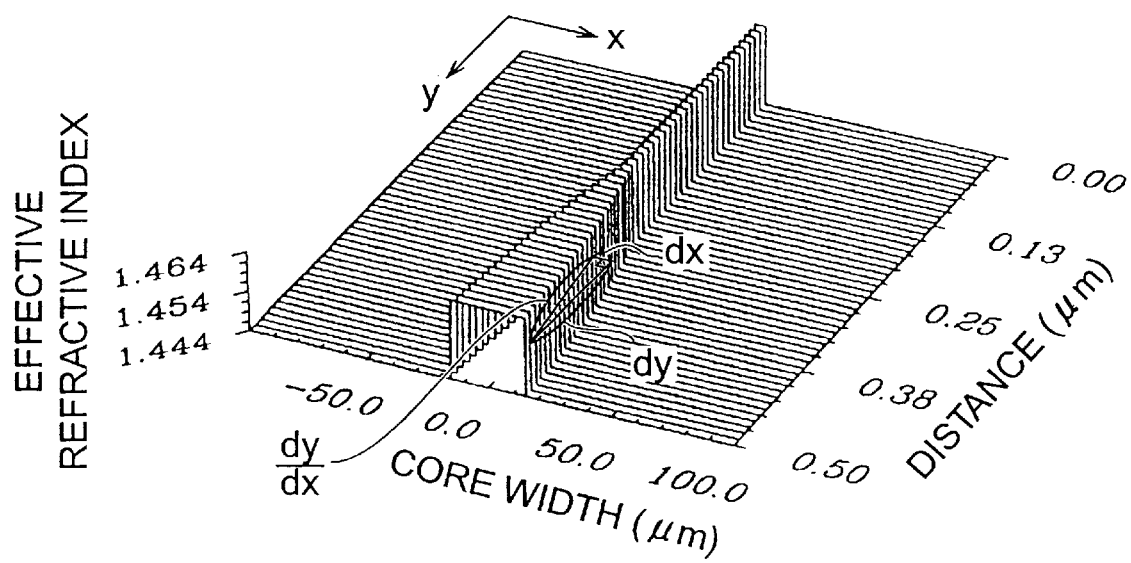
FIGS. 13A and 13B are diagrams to stereoscopically show part of the AWG circuit of the second conventional example and the electric field strength distribution thereof.
Figure 13B:
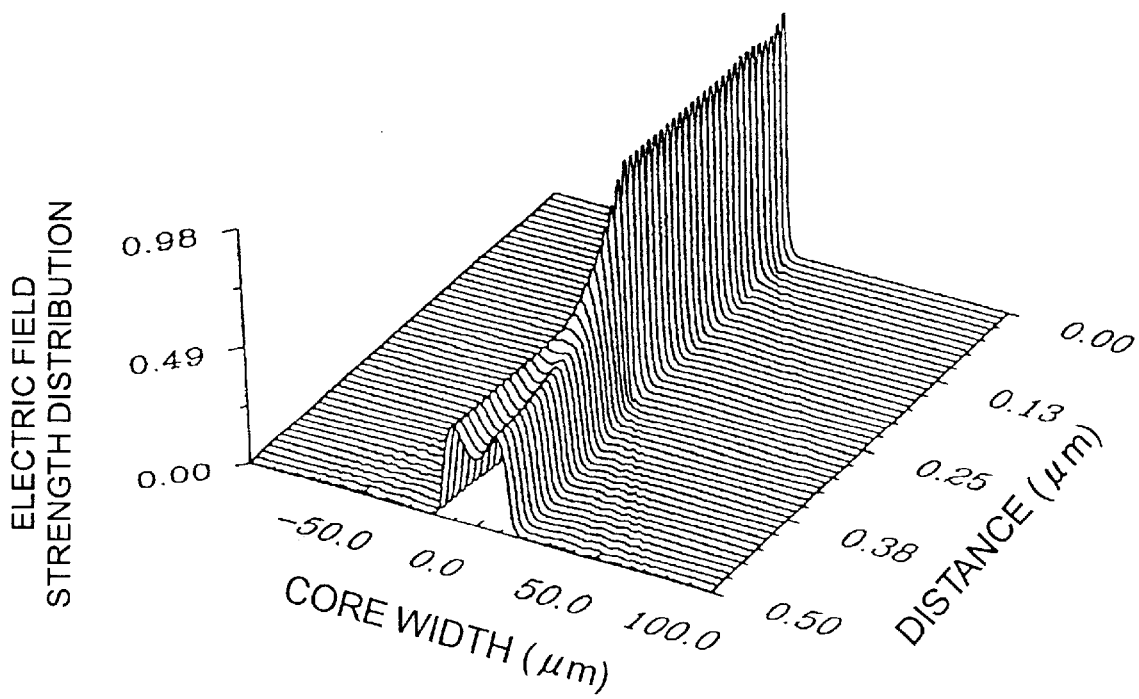

Next, FIG. 11 is a plan view to show the waveguide structure of the light input part (corresponding to the light input part of FIG. 1) in the second embodiment of the optical multiplexer/demultiplexer according to the present invention.

The basic structure of this second embodiment is also the same as that of the first embodiment except that the MMI coupler 170 is disposed between the optical output end of the input waveguide 110 and the optical input end of the first portion 161 in the free propagation area 160 (which agrees with the optical input end face 160a of the free propagation area 160). When this structure is employed for the AWG circuit as illustrated in FIG. 1, the AWG circuit is obtained with higher manufacturing tolerance than the conventional AWG circuits and with capability of further improvement in the transmission wavelength characteristics.

According to the present invention, as described above, the waveguide for improving the transmission wavelength characteristics is provided as the free propagation area consisting of the first portion having the side faces extending along the predetermined curves so as to increase the width from the input waveguide toward the first slab waveguide and the second portion disposed between the first portion and the first slab waveguide and having the width larger than that of the input waveguide, between the input waveguide and the first slab waveguide. Since the first portion once broadens the electric field strength distribution of the light traveling from the input waveguide to the first slab waveguide but the second portion restricts the broadening of the electric field strength distribution of the propagating light on the other hand, change of the electric field strength distribution becomes less susceptible to the change of the waveguide width, so as to achieve the effect of relaxing the required accuracy for microprocessing.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical multiplexer/demultiplexer comprising:
   a substrate;
   first and second slab waveguides provided on said substrate, each having a predetermined slab length;
   a waveguide provided on said substrate, said waveguide being at least one input waveguide for guiding light into said first slab waveguide;
   waveguides flatly arrayed on said substrate in a state in which optical input ends of the respective waveguides are connected to an optical output end face of said second slab waveguide, said waveguides being a plurality of output waveguides provided corresponding to respective signals of channel wavelengths set as signal channels at predetermined wavelength intervals;
   waveguides flatly arrayed on said substrate in a state in which optical input ends of the respective waveguides are connected to an optical output end face of the first slab waveguide so as to place said first slab waveguide between said waveguides and said input waveguide and in which optical output ends of the respective waveguides are connected to an optical input end face of the second slab waveguide so as to place said second slab waveguide between said waveguides and said output waveguides, said waveguides being a plurality of channel waveguides of mutually different lengths; and
   a waveguide provided between said input waveguide and said first slab waveguide, said waveguide being a free propagation area comprised of a first portion having side faces which extend along respective predetermined curves so as to increase width from an optical output end of the input waveguide toward an optical input end face of the first slab waveguide, and a second portion provided between the first portion and the first slab waveguide and having width larger than that of the input waveguide; and
   wherein said predetermined curves are curves represented by exponential functions.

2. An optical multiplexer/demultiplexer according to claim 1, wherein in an x–z coordinate system agreeing with a surface of said substrate, a reference line Xp(z) passing each of center points $(x_s, z_s)$, $(x_e, z_e)$ in an optical input end face and an optical output end face of said first portion being surfaces parallel to the x-axis, is given by the following equation:

$$Xp(z) = x_s + \frac{x_e - x_s}{z_e - z_s}(z - z_s),$$

the width w(z) of said first portion parallel to the x-axis is given by the following equation:

$$w(z) = w_s + A\left(\exp\left(-\alpha\frac{z - z_s}{z_e - z_s}\right) - 1\right), \ldots A = \frac{w_e - w_s}{\exp(-\alpha) - 1}$$

$w_s$: the width of the optical input end face of said first portion, $w_e$: the width of the optical output end face of said first portion, α: an exponential coefficient, and the side faces of said first portion extend along the curves given by the following equations:

$$x_l(z) = x_p(z) - \frac{w(z)}{2}, \quad x_n(z) = x_p(z) + \frac{w(z)}{2}.$$

3. An optical multiplexer/demultiplexer according to claim 1, wherein a relative refractive-index difference between cores corresponding to the waveguides provided on said substrate and a cladding provided on the substrate so as to cover the cores, is not less than 1%.

4. An optical multiplexer/demultiplexer according to claim 1, wherein said input waveguide, said channel waveguides, and said output waveguides all have the width of not more than 5.5 μm.

5. An optical multiplexer/demultiplexer according to claim 1, further comprising a multi-mode interference coupler provided between the optical output end of said input waveguide and an optical input end of the first portion in said free propagation area.

6. An optical multiplexer/demultiplexer according to claim 1, wherein the optical output end of said input waveguide is spaced 2.0 or more μm apart from the optical input end face of said first slab waveguide at least through said free propagation area.

7. An optical multiplexer/demultiplexer comprising:

a substrate;

first and second slab waveguides provided on said substrate, each having a predetermined slab length;

a waveguide provided on said substrate, said waveguide being at least one input waveguide for guiding light into said first slab waveguide; waveguides flatly arrayed on said substrate in a state in which optical input ends of the respective waveguides are connected to an optical output end face of said second slab waveguide, said waveguides being a plurality of output waveguides provided corresponding to respective signals of channel wavelengths set as signal channels at predetermined wavelength intervals;

waveguides flatly arrayed on said substrate in a state in which optical input ends of the respective waveguides are connected to an optical output end face of the first slab waveguide so as to place said first slab waveguide between said waveguides and said input waveguide and in which optical output ends of the respective waveguides are connected to an optical input end face of the second slab waveguide so as to place said second slab waveguide between said waveguides and said output waveguides, said waveguides being a plurality of channel waveguides of mutually different lengths; and a waveguide provided between said input waveguide and said first slab waveguide and provided for coupling part of the fundamental mode of light having propagated through the input waveguide, to a higher order mode, said waveguide being a free propagation area comprised of a first portion for broadening an electric field strength distribution of light propagating from an optical output end of the input waveguide toward an optical input end face of said first slab waveguide by diffraction, and a second portion for limiting broadening of the electric field strength distribution of the light having passed through the first portion; and further comprising a multi-mode interference coupler provided between the optical output end of said input waveguide and an optical input end of the first portion in said free propagation area.

8. An optical multiplexer/demultiplexer according to claim 7, wherein a relative refractive-index difference between cores corresponding to the waveguides provided on said substrate and a cladding provided on the substrate so as to cover the cores, is not less than 1%.

9. An optical multiplexer/demultiplexer according to claim 7, wherein said input waveguide, said channel waveguides, and said output waveguides all have the width of not more than 5.5 μm.

10. An optical multiplexer/demultiplexer according to claim 7, wherein the optical output end of said input waveguide is spaced 2.0 or more μm apart from the optical input end face of said first slab waveguide at least through said free propagation area.

* * * * *